April 13, 1937.　　　E. EHLERS　　　2,076,811
STRUCTURAL JOINT FOR ANGLE BARS
Filed Jan. 16, 1935
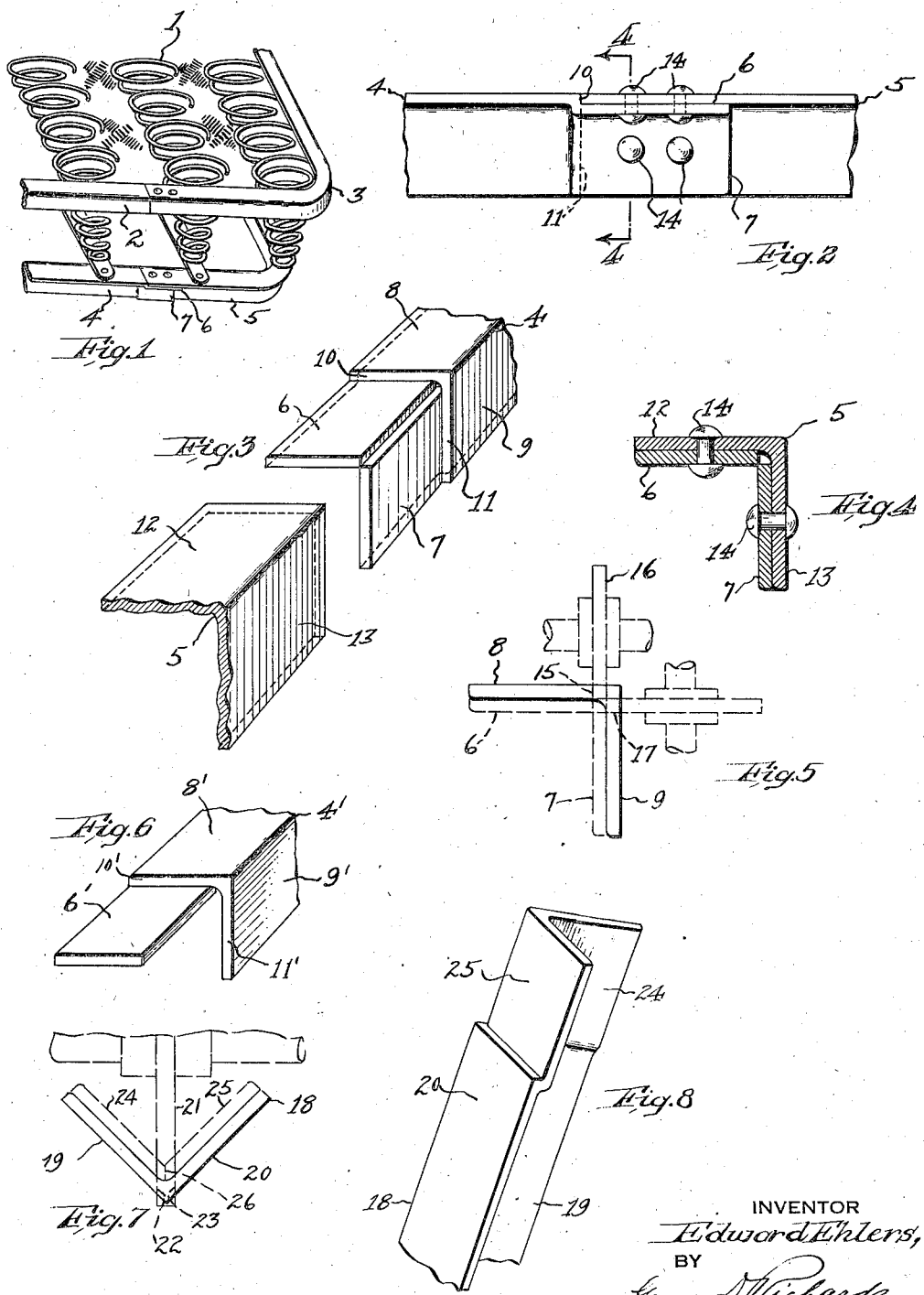
INVENTOR
Edward Ehlers,
BY
George D. Richards
ATTORNEY Patented Apr. 13, 1937

2,076,811

UNITED STATES PATENT OFFICE 2,076,811

STRUCTURAL JOINT FOR ANGLE BARS

Edward Ehlers, Montclair, N. J.

Application January 16, 1935, Serial No. 2,029

4 Claims. (Cl. 189—36)

This invention relates, generally, to means for joining structural members and the invention has reference, more particularly, to a novel structural joint for connecting angle bars in end to end relation to one another.

Heretofore, in connecting angle bars in end to end relation it has been common to employ a gusset plate, or other coupling means such as a short length of angle bar, which coupling means is laid over the adjacent and abutting end portions of the angle bars to be connected and is then riveted or otherwise secured to both angle bars, thereby connecting the same together. The coupling means forms a protuberance at the point of connection of the two angle bars, which protuberance is unsightly and highly undesirable, especially in places where appearance is of importance. Furthermore, such separable coupling means cannot always be relied upon to produce a rigid and permanent joint, especially where vibration or motion of the connected angle bars obtains in use.

The principal object of the present invention is to provide a novel structural joint for angle bars which is so constructed and arranged that its presence is hardly detected by a casual view of the connected angle bars, the said connected angle bars merging into one another without the use of any exterior protuberance and with but a slight line separating the abutting ends of the said connected angle bars.

Another object of the present invention lies in the provision of a novel structural joint of the above character that employs a coupling member formed integrally with one of the connected angle bars, thereby providing a rigid and permanent connection between such angle bar and the coupling member and eliminating the necessity of securing the coupling member to such angle bar.

Other objects of this invention, not at this time more particularly enumerated, will be clearly understood from the following detailed description of the same.

The invention is clearly illustrated in the accompanying drawing, in which:—

Fig. 1 is a fragmentary perspective view showing a bed spring having angle bars connected by the novel structural joint of this invention.

Fig. 2 is an enlarged fragmentary view showing the two lower angle bars of Fig. 1 connected by the joint of the invention.

Fig. 3 is a perspective view showing the joint prior to assembly.

Fig. 4 is a vertical view taken along line 4—4 of Fig. 2 looking in the direction of the arrows.

Fig. 5 is a schematic view illustrating a step in the production of the joint.

Fig. 6 is a fragmentary perspective view illustrating a slightly modified joint.

Fig. 7 is a schematic view illustrating an alternative step used in producing the joint, and Fig. 8 is a perspective view of a form of the joint.

Similar characters of reference are employed in said views, to indicate corresponding parts.

Referring now to Figs. 1 to 4 of the drawing, the reference numeral 1 designates a bed spring having upper angles 2 and 3 that are interconnected by the novel joint of this invention and lower angles 4 and 5 also interconnected by the joint of this invention. Although the novel joint is illustrated as used for interconnecting the frame members of a bed spring, it is to be understood that the same is equally applicable for other uses such as building or machine construction, or, in fact, for any purpose where angle bars are employed.

As especially shown in Figs. 2 to 4, the joint comprises essentially inwardly offset end tongues or connecting members 6 and 7 that are formed integrally with the respective flanges 8 and 9 of the angle bar 4 and project from the ends of these flanges. Each of tongues 6 and 7 is inwardly offset from its respective flange a distance equal to the thickness of the flange and lies in a plane extending parallel to that of the flange, whereby a space is provided externally of each of these tongues for receiving a respective flange of angle bar 5, the latter angle bar being of the same size as the angle bar 4 to which it is connected. The inward offsetting of the tongues 6 and 7 also provides shoulders 10 and 11 against which the flanges 12 and 13 of angle bar 5 abut when the angle bars are assembled.

Round headed rivets 14, extending through registering apertures in the angle bar 5 and in the tongues 6 and 7, serve to secure the angle bars rigidly together, the stop shoulders 10 and 11 cooperating with tongues 6 and 7 and with rivets 14 in providing a permanently rigid connection. With the joint completed, it will be noted that the outer surfaces of angle bars 4 and 5 are flush with one another and that a line or crack of only slight width separates these angle bars, which line or crack may be largely obliterated by paint or other filling material, if desired, thereby substantially hiding the joint. The round heads of rivets 14 are the only exterior protuberances and these can be eliminated, if desired, by the use of countersunk, flat headed rivets, thereby largely concealing all evidence of the joint, which is especially desirable in furniture construction.

Fig. 5 illustrates one manner of forming the tongues 6 and 7 from the flanges 8 and 9 of angle bar 4. A rotary cutter 16 is used to cut a longitudinal slot 15 in flange 8 of a length equal to that of the tongue 6 to be formed, which slot 15 is cut immediately adjacent the flange 9. A similar slot 17 is cut in flange 9 immediately adjacent the flange 8. Thereafter, the thusly separated end portions of flanges 8 and 9 are pressed or stamped inwardly under heat and pressure to form the tongues 6 and 7 and shoulders 10 and 11.

In some instances, only one tongue or connecting member may be desired, in which case, the angle bar is cut so as to only form the one tongue. This is illustrated in Fig. 6 wherein the angle bar 4' is shown as having but one tongue or connecting member 6'.

Fig. 7 illustrates another manner of cutting the angle bar preparatory to forming the tongues or connecting members. In this view, the angle bar 18 is held so that its flanges 19 and 20 make angles of 45° with the cutter blade 21, whereby this blade cuts a slot having side walls 22 and 23 that extend obliquely to the flanges 19 and 20. When the thusly separated end portions of the flanges are pressed inwardly forming tongues 24 and 25 the side walls 22 and 23 abut one another, thereby forming a butt joint 26. The general appearance of this completed joint is shown in Fig. 8. If sufficient pressure and heat are used, the joint of Fig. 8 may be made by directly stamping the tongues 19 and 20 from the body of the angle bar 18 and without a previous cutting operation, but ordinarily such cutting operation is necessary and this operation is necessary where a neat and tight joint is desired.

It will be apparent that instead of cutting out metal at the end portion of angles 4, 4' and 18 preparatory to forming the tongues, such metal may be removed by a stamping operation. Also, although heat is preferably employed in inwardly offsetting the thusly separated end portions of the angle bar flanges to form the connecting tongues, yet in some instances these tongues may be formed by cold pressing.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:

1. A structural joint for connecting a pair of angle bars in end to end relation comprising, a connecting member formed integral with the first of said angle bars, said connecting member comprising independent tongues respectively extending from the respective flanges of said first angle bar, said tongues being inwardly offset for underlying the flanges of the second angle bar, and providing a stop shoulder at its point of juncture with the first angle bar, said stop shoulder forming a sharp 90° angle with said connecting member and serving to neatly abut the end of the second angle bar to provide a close fit, and fastening means for rigidly interconnecting said connecting member with the second angle bar.

2. A structural joint for connecting a pair of angle bars in end to end relation comprising, a connecting member consisting of tongues formed integral with the flanges of the first of said angle bars, said connecting member tongues lying in planes extending parallel to the respective flanges of said first angle bar and being inwardly offset from said flanges a distance equal to the thickness of such flange, whereby said connecting member is arranged to underlie the flanges of the second angle bar, and stop shoulder means provided on the first angle bar and forming a sharp 90° angle with said connecting member for closely abutting the second angle bar.

3. In combination, a pair of angle bars and a structural joint for connecting said angle bars in end to end relation, one of said angle bars being slitted for a portion of its length at an end portion thereof at the juncture of its flanges, the two projecting flange end portions thus formed being inwardly offset to provide connecting tongues for underlying the flanges of the second angle bar, and fastening means for securing said connecting tongues to said second angle bar.

4. In combination, a pair of angle bars and a structural joint for connecting said angle bars in end to end relation, one of said angle bars being slitted for a portion of its length at an end portion thereof at the juncture of its flanges, the two projecting flange end portions thus formed being inwardly offset to provide connecting tongues for underlying the flanges of the second angle bar, said first angle bar having stop shoulders at the point of juncture of said connecting tongues therewith, said stop shoulders serving to engage said second angle bar in stopped relation, and fastening members for securing said connecting tongues to said second angle bar.

EDWARD EHLERS.